(12) United States Patent
Tame

(10) Patent No.: US 8,276,983 B2
(45) Date of Patent: Oct. 2, 2012

(54) MANUAL RETRACTING HEAD RESTRAINT

(75) Inventor: Omar D. Tame, West Bloomfield, MI (US)

(73) Assignee: Magna Seating Inc., Aurora, Ontario (CA)

( * ) Notice: Subject to any disclaimer, the term of this patent is extended or adjusted under 35 U.S.C. 154(b) by 156 days.

(21) Appl. No.: 12/746,960

(22) PCT Filed: Dec. 11, 2008

(86) PCT No.: PCT/CA2008/002142
§ 371 (c)(1),
(2), (4) Date: Jun. 9, 2010

(87) PCT Pub. No.: WO2009/073968
PCT Pub. Date: Jun. 18, 2009

(65) Prior Publication Data
US 2010/0264714 A1    Oct. 21, 2010

Related U.S. Application Data

(60) Provisional application No. 61/012,797, filed on Dec. 11, 2007.

(51) Int. Cl.
*B60N 2/48* (2006.01)
(52) U.S. Cl. .......................... 297/61; 297/410
(58) Field of Classification Search ............. 297/61, 297/410
See application file for complete search history.

(56) References Cited

U.S. PATENT DOCUMENTS

| | | | | |
|---|---|---|---|---|
| 2,947,352 A * | 8/1960 | Schliephacke | ................ | 297/61 |
| 3,065,029 A * | 11/1962 | Spound et al. | ................ | 297/391 |
| 5,346,283 A * | 9/1994 | Steininger et al. | ............ | 297/408 |
| 5,918,940 A * | 7/1999 | Wakamatsu et al. | .......... | 297/410 |
| 6,192,565 B1 | 2/2001 | Tame | | |
| 6,390,558 B2 * | 5/2002 | Fischer et al. | ................ | 297/410 |
| 6,726,283 B2 * | 4/2004 | Schambre et al. | ............ | 297/410 |
| 7,059,681 B2 | 6/2006 | Kubo | | |
| 7,118,171 B2 * | 10/2006 | Fowler et al. | ................ | 297/61 |
| 7,140,687 B2 | 11/2006 | Hoekstra et al. | | |
| 7,210,734 B1 | 5/2007 | Yetukuri et al. | | |
| 2002/0079723 A1 * | 6/2002 | Risch et al. | ................ | 297/61 |
| 2006/0197366 A1 | 9/2006 | Saberan | | |

FOREIGN PATENT DOCUMENTS

| | | |
|---|---|---|
| CA | 2421029 A1 | 3/2002 |
| FR | 2797822 A1 | 3/2001 |
| FR | 2910400 A1 | 6/2008 |
| GB | 2318285 A | 4/1998 |
| JP | 2004313456 A | 11/2004 |

* cited by examiner

*Primary Examiner* — Peter R. Brown
(74) *Attorney, Agent, or Firm* — Miller Canfield

(57) ABSTRACT

A seat assembly includes a seat back pivotally coupled to a seat cushion for movement between a generally upright seating position and a folded position overlying the seat cushion. A head restraint is slidably coupled to an upper end of the seat back for vertical movement between a use position spaced apart from the upper end and a stowed position adjacent the upper end. A mechanism is operative for automatically moving the head restraint between the use and stowed positions in response to pivoting the seat back between the seating and folded positions.

11 Claims, 4 Drawing Sheets

MANUAL RETRACTING HEAD RESTRAINT

CROSS REFERENCE TO RELATED APPLICATIONS

This application is a national phase application and claims the benefit, under 35 U.S.C. §371, of PCT/CA2008/02142, filed on Dec. 11, 2008, which in turn claims all the benefits and priority of U.S. Provisional Application No. 61/012,797, filed on Dec. 11, 2007. All applications are incorporated herein by reference in their entireties.

BACKGROUND OF THE INVENTION

1. Field of the Invention

The invention relates to a seat assembly for an automotive vehicle. More particularly, the invention relates to a head restraint that automatically moves between a use position and a stowed position in response to pivoting a seat back between an upright seating position and a forwardly folded position.

2. Description of Related Art

Seat assemblies in many passenger vehicles, such as automobiles, include a head restraint which provides added comfort for a passenger. In addition to the comfort feature, the head restraint also provides a safety feature. Namely, the head restraint restricts head movement of a seat occupant during a rear impact collision, which reduces the likelihood of whiplash type injuries. Typically, the head restraint is mounted to an upper end of a seat back as either an integral part of the seat back or as a separate unit mounted to the seat back. The separable head restraints usually include some type of height adjustment mechanism. One problem with having head restraints, particularly in second and third row seat assemblies, is the head restraints obstruct the view for the driver and/or passengers out the rear of the automobile. Another problem is the effect of increasing the total height of the seat back. This increased height is a problem when designing stowage systems for seats. More specifically, when the seat back is folded forwardly the head restraint may interfere with a back side of a forward seat, thereby preventing the seat back from pivoting to a stowed position and reducing the total storage space within the automobile. Additionally, the head restraint may present clearance problems when attempting to stow the seat assembly within a recess in a floor of the automobile.

To address these problems, various stowable head restraint assemblies have been developed that include mechanisms for moving a head restraint between a use position and a stowed position. These mechanisms can be quite complicated and some require the head restraint be manually returned to the use position after being moved to the stowed position. It is therefore desirable to provide a simple and robust mechanism or activation assembly for automatically raising and lowering a head restraint in response to pivoting a seat back between an upright seating position and a forwardly folded position.

SUMMARY OF THE INVENTION

According to one aspect of the invention, a seat assembly for supporting an occupant in a motor vehicle includes a seat back pivotally coupled to a seat cushion for movement between a generally upright seating position and a folded position overlying the seat cushion. A head restraint is slidably coupled to an upper end of the seat back. The head restraint is movable vertically between a use position spaced apart from the upper end of the seat back and a stowed position adjacent the upper end of the seat back. A mechanism is operative for automatically moving the head restraint between the use position and the stowed position in response to pivoting the seat back between the seating position and the folded position. The mechanism includes a first pulley rotatably mounted to the seat back, a linkage pivotally coupled between the first pulley and the head restraint, and a cable operatively coupled between the first pulley and a fixed end. Pivoting the seat back from the seating position to the folded position effectively shortens the cable thereby rotating the pulley in a first direction and actuating the linkage to move the head restraint from the use position to the stowed position. Pivoting the seat back from the folded position to the seating position effectively lengthens the cable thereby rotating the pulley in a second direction and actuating the linkage to move the head restraint from the stowed position to the use position.

According to another aspect of the invention, a mechanism is provided for automatically moving a head restraint between a use position and a stowed position in response to pivoting a seat back between a seating position and a folded position. The mechanism includes a pulley rotatably coupled to the seat back. The mechanism also includes a linkage pivotally coupled between the pulley and the head restraint. The mechanism further includes a cable operatively coupled between the pulley and a fixed end. Pivoting the seat back from the seating position to the folded position effectively shortens the cable thereby rotating the pulley in a first direction and actuating the linkage to move the head restraint from the use position to the stowed position. Pivoting the seat back from the folded position to the seating position effectively lengthens the cable thereby rotating the pulley in a second direction and actuating the linkage to move the head restraint from the stowed position to the use position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1A:
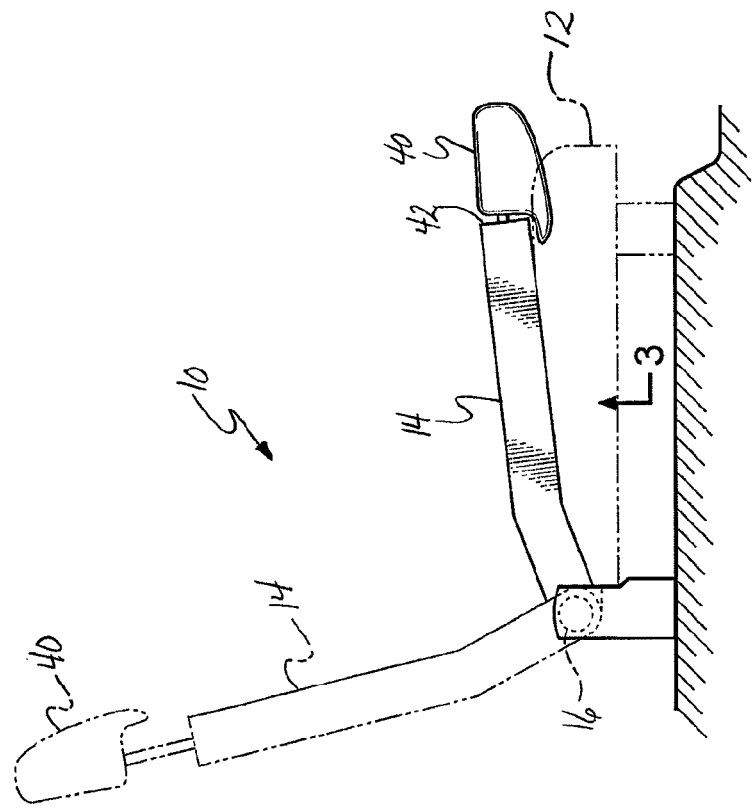
FIG. 1A is a side view of a seat assembly with a seat back in a generally upright seating position including a head restraint in a use position.
Figure 1B:
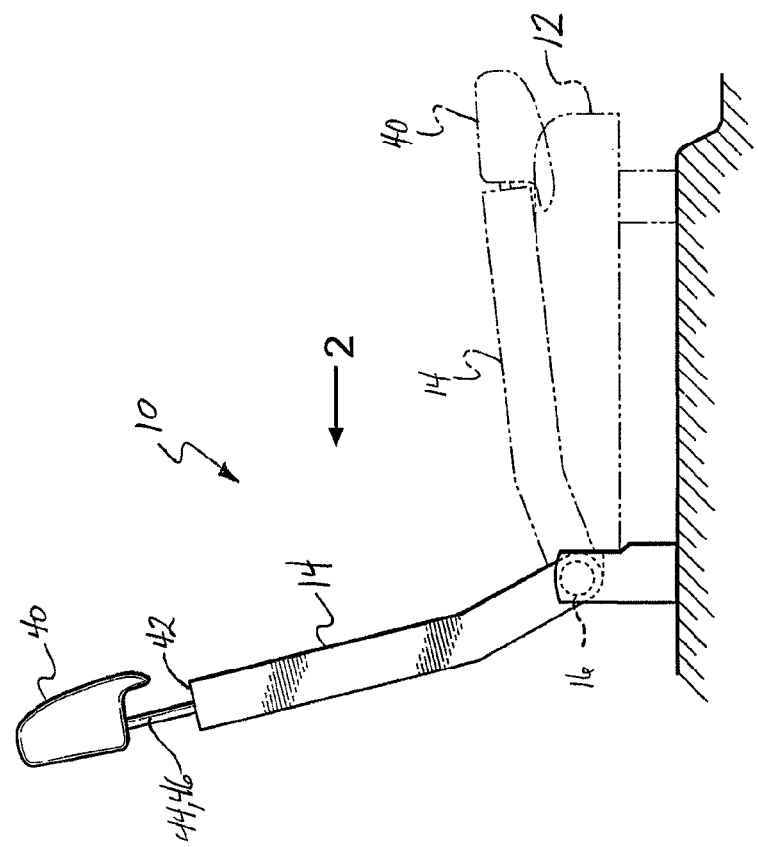
FIG. 1B is a side view of the seat assembly with the seat back in a folded position with the head restraint in a stowed position.

Referring to FIGS. 1 through 4, a seat assembly for a motor vehicle is generally shown at 10. The seat assembly 10 includes a generally horizontal seat cushion 12 and a seat back 14 for supporting an occupant on the seat assembly 10. The seat back 14 is pivotally coupled to the seat cushion 12 by any conventional means, such as a pair of recliner mechanisms 16 (one shown), as is well known in the art. The pair of recliner mechanisms 16 allows for pivotal movement of the seat back 14 about a pivot axis 18 between a generally upright seating position, shown in FIG. 1A, and a forwardly folded position overlying the seat cushion 12, shown in FIG. 1B.

The construction of the seat back 14 includes a seat back frame 20 supporting a flexible foam pad encased by a trim cover, as is well known to one skilled in the art. The seat back frame 20 includes a pair of spaced apart and generally parallel side members 22, 24. Each side member 22, 24 extends between opposite upper and lower ends 26, 28. An upper cross member 30 extends between the upper ends 26 of the side members 22, 24 and a lower cross member 32 extends between the lower ends 28 of the side members 22, 24. First and second seat back brackets 34, 36 are integrally formed at the lower ends 28 of the respective side members 22, 24. Alternatively, the first and second seat back brackets 34, 36 could be fixedly secured to the lower ends 28 of the respective side members 22, 24 by any conventional means, such as being welded or bolted thereto.

Likewise, the construction of the seat cushion 12 includes a rigid seat cushion frame (not shown) for supporting a contoured foam pad encased by a trim cover. First and second seat cushion brackets 38 (one shown) are integrally formed at a rear end of the seat cushion frame. Alternatively, the first and second seat cushion brackets 38 could be fixedly secured to the seat cushion frame by any conventional means, such as being welded or bolted thereto. The pair of recliner mechanisms 16 is disposed between the first and second seat back brackets 34, 36 and the first and second seat cushion brackets 38.

The seat assembly 10 also includes a head restraint 40 for comfort and for restricting head movement of the occupant during a motor vehicle impact. The head restraint 40 is slidably coupled to the upper cross member 30 of the seat back frame 20 as is described below in greater detail. The head restraint 40 is movable between a use position when the seat back 14 is in the seating position and a stowed position when the seat back 14 is in the folded position. In the use position, the head restraint 40 is in a raised position such that it is disposed upward and spaced apart from an upper end 42 of the seat back 14, thereby increasing the overall height of the seat back 14 to provide the desired comfort and support for the occupant's head. In the stowed position, the head restraint 40 is in a lowered position such that it is disposed adjacent to the upper end 42 of the seat back 14, thereby decreasing the overall height of the seat back 14. As a result, there is greater clearance between the head restraint 40 and a front seat (not shown) for pivoting the seat back 14 into the folded position, thereby increasing the stowage space within the motor vehicle. Although the seat assembly 10 is described as a rear seat, it is appreciated that the seat assembly 10 may be any seat within the motor vehicle. It is also contemplated that the head restraint 40 may move between the use and stowed positions as the seat back 14 pivots between the seating position and any secondary position, such as a forwardly inclined dump position, without varying from the scope of the invention.

The seat assembly 10 further includes a mechanism, generally shown at 43, for automatically moving the head restraint 40 between the use position and the stowed position in response to pivotal movement of the seat back 14 relative to the seat cushion 12. More specifically, a pair of spaced apart head restraint posts 44, 46 is slidably guided by a pair of guide tubes 48, 50 fixedly secured to the upper cross member 30 of the seat back frame 20. Alternatively, it is appreciated that the guide tubes 48, 50 may be replaced by openings formed directly in an upper cross member of a stamped or cast seat back frame without varying from the scope of the invention. The head restraint posts 44, 46 extend between and are fixedly secured to the head restraint 40 and a guide plate 52 that is disposed between the side members 22, 24 of the seat back frame 20.

In the current embodiment, two head restraints 40 are shown. Each head restraint 40 includes a pair of head restraint posts 44, 46 extending between the respective head restraint 40 and the guide plate 52. It is appreciated, however, that only one head restraint 40 or more than two head restraints 40 could be attached to the guide plate 52 without varying from the scope of the invention. In such alternative embodiments, each head restraint 40 includes a pair of head restraint posts 44, 46 extending between the respective head restraint 40 and the guide plate 52. It is further appreciated that each head restraint 40 may include a single head restraint post or more than a pair of head restraint posts.

A first wheel or pulley 54 is rotatably mounted on the lower cross member 32 of the seat back frame 20. In the embodiment shown, the first pulley 54 is disposed generally towards the side member 24, however, the first pulley 54 can be located in any suitable position. The first pulley 54 defines a first rotation axis 56 which extends generally perpendicular to the pivot axis 18. A clock spring 58 extends between the first pulley 54 and a post 60 fixedly secured to the lower cross member 32 of the seat back frame 20. The spring 58 biases the first pulley 54 in a clockwise direction (when viewed from FIGS. 2 through 4).

Figure 2:
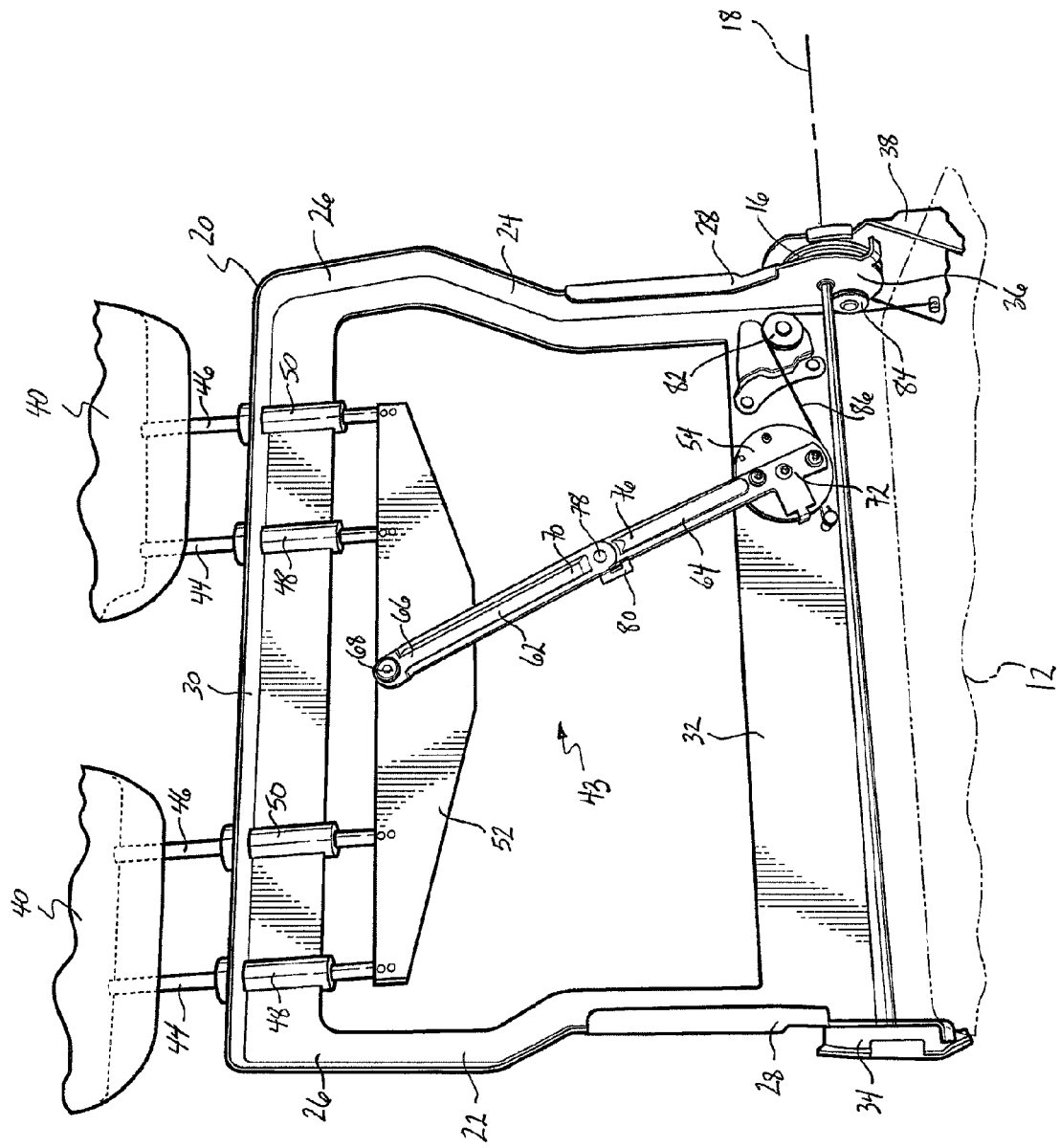
FIG. 2 is a fragmentary, perspective view taken from the direction indicated in FIG. 1A illustrating a mechanism for moving the head restraint between the use and stowed positions according to one embodiment of the invention.
Figure 3:
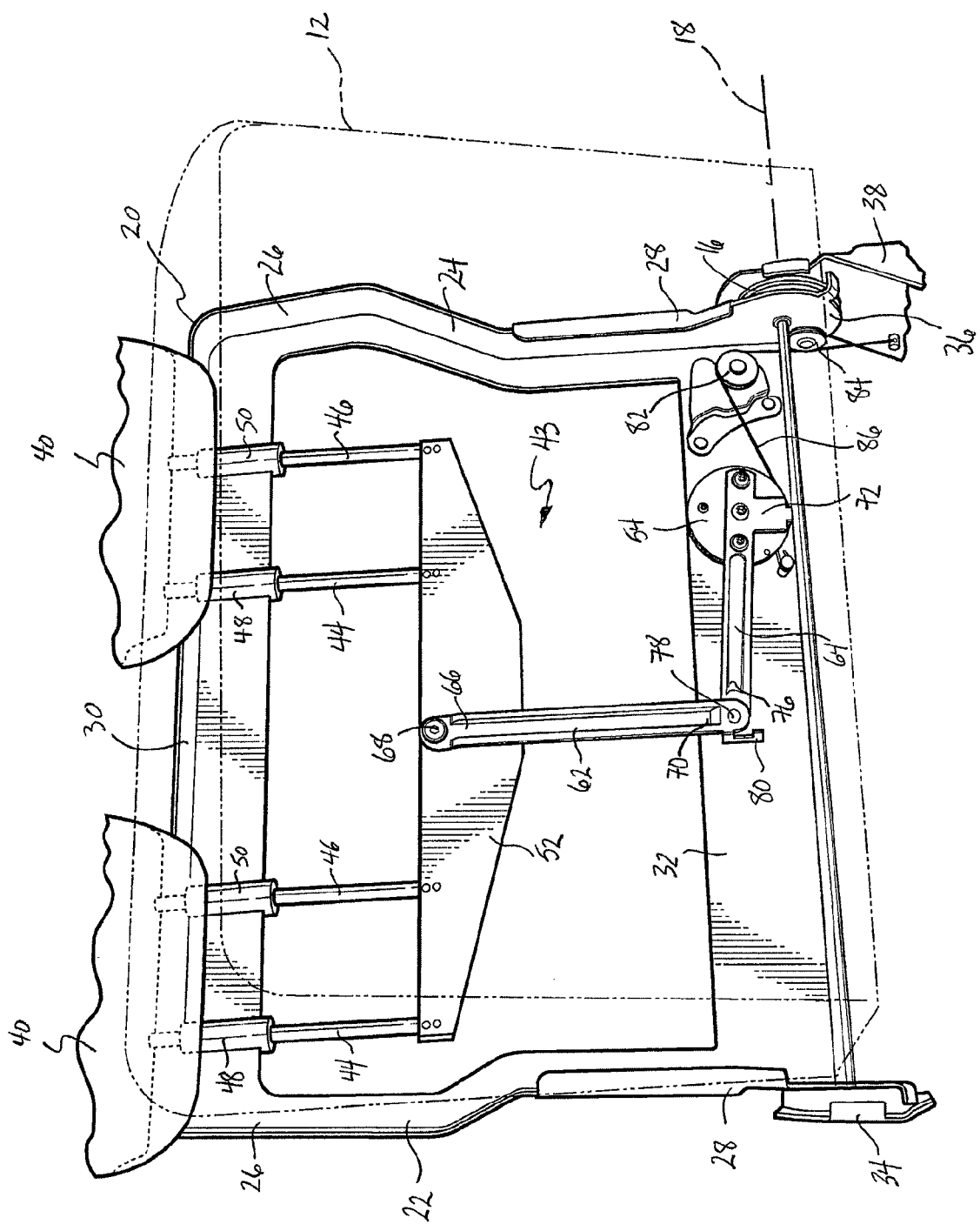
FIG. 3 is a fragmentary, perspective view taken from the direction indicated in FIG. 1B illustrating the mechanism when the seat back is in the folded position with the head restraint in the stowed position.

A linkage, including an upper link 62 and a lower link 64 is operatively coupled between the guide plate 52 and the first pulley 54. More specifically, the upper link 62 extends between a first end 66 pivotally coupled to the guide plate 52 at pivot 68 and an opposite second end 70. In the embodiment shown, the pivot 68 is generally centered on the guide plate 52, however, the pivot 68 can be located at any suitable position. The lower link 64 extends between a first end 72 fixedly secured to a face 74 of the first pulley 54 and an opposite second end 76 pivotally coupled to the second end 70 of the upper link 62 at pivot 78. When the head restraint 40 is in the use position the upper and lower links 62, 64 are generally aligned such that the linkage is slightly over-center in a positive locked condition, as shown in FIG. 2. More particularly, the upper and lower links 62, 64 form a first angle A that is greater than 180 degrees. A tab 80, fixedly secured to the second end 70 of the upper link 62 abuts the second end 76 of the lower link 64 to maintain the linkage in the positive locked condition. Thus, with the linkage in the positive locked condition, the head restraint 40 is prevented from inadvertently moving to the stowed position because any downward force applied to the head restraint 40 will urge the tab 80 against the second end 76 of the lower link 64. When the head restraint 40 is in the stowed position the linkage is folded, as shown in FIG. 3. More particularly, the upper and lower links 62, 64 form a second angle B that is less than 180 degrees.

The spring 58 biases the first pulley 54 in the clockwise direction, which urges the linkage toward the positive locked condition and the head restraint 40 toward the use position. It is contemplated that any of a variety of biasing means could be used to urge the head restraint 40 toward the use position. For example, a clock spring at pivot 78; compression springs disposed between the head restraint posts 44, 46 and the guide tubes 48, 50; or an extension spring extending between the linkage and the seat back frame 20 would all suitably urge the head restraint toward the use position.

Second and third pulleys 82, 84 are mounted to the seat back frame 20 for guiding a cable 86 between the first pulley 54 and the seat cushion 12. More specifically, the second pulley 82 is rotatably mounted on the lower cross member 32 of the seat back frame 20 adjacent to the side member 24. The second pulley 82 defines a second rotation axis 88 which extends perpendicular to the pivot axis 18 and is generally parallel to and offset from the first rotation axis 56 of the first pulley 54. The third pulley 84 is rotatably mounted on the second seat back bracket 36. The third pulley 84 defines a third rotation axis 90 which extends parallel to and is offset from the pivot axis 18 and is generally perpendicular to the first and second rotation axes 56, 88.

Figure 4:
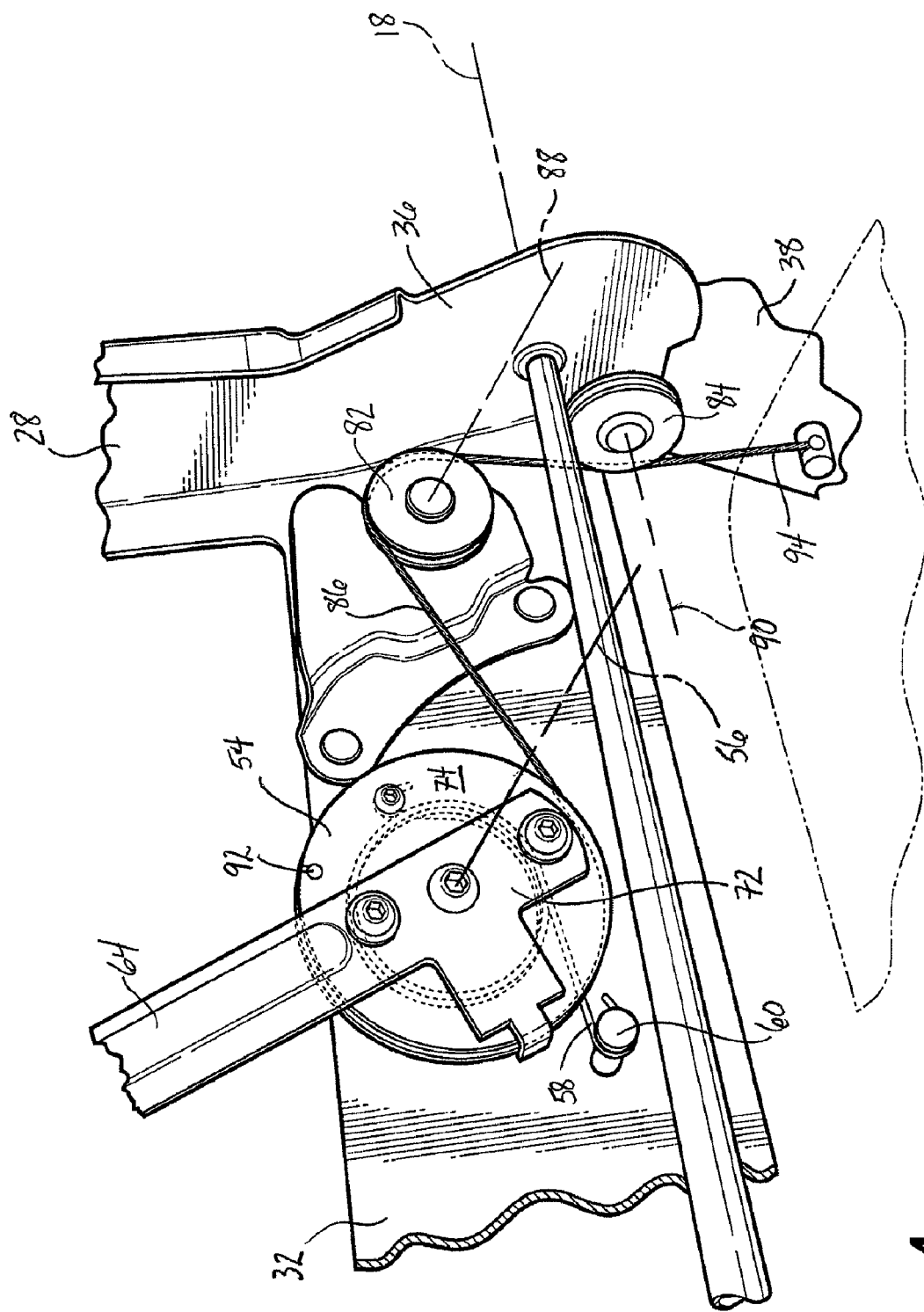
FIG. 4 is a fragmentary, enlarged perspective view of the mechanism when the seat back is in the generally upright position with the head restraint in the use position.

The cable 86 is fixedly secured at a first end 92 to the first pulley 54 and is guided around a portion of an outer circumference thereof in a counterclockwise direction (when viewed from FIGS. 2 through 4). The cable 86 then extends from the first pulley 54 to the second pulley 82 where it is guided around a portion of an outer circumference thereof in the clockwise direction. The second pulley 82 changes the direction of the cable 86 such that it extends downwardly from the second pulley 82 to the third pulley 84 where it is guided along a portion of an outer circumference thereof before terminating at a second end 94 fixedly secured to the second seat cushion bracket 38. It is appreciated that the second and third pulleys 82, 84 could be replaced with a guide tube or other fixed guide members for guiding the cable 86 between the first pulley 54 and the seat cushion 12 without varying from the scope of the invention.

In operation, starting with the seat back 14 in the seating position and the head restraint 40 in the use position, the seat back 14 may be pivoted forwardly toward the folded position by actuating a handle lever (not shown) to release the recliner mechanisms 16, as is well known in the art. As the seat back 14 pivots forward the cable path is lengthened, thereby shortening the effective length of the cable 86. More specifically, the distance between the third rotation axis 90 and the fixed location of the second end 94 of the cable 86 increases as the seat back 14 is pivoted forwardly about the pivot axis 18 toward the folded position, shortening the effective length of the cable 86. Shortening the effective length of the cable 86 pulls the cable 86, thereby causing the first pulley 54 to rotate in the counterclockwise direction. Counterclockwise rotation of the first pulley 54 causes the lower link 64 to pivot in the counterclockwise direction about its first end 72, which simultaneously causes the upper link 62 to pivot in the clockwise direction about pivot 78, thereby releasing the linkage from the positive locked condition. As the first pulley 54 continues to rotate in the counterclockwise direction, the linkage goes over-center resulting in downward vertical movement of the guide plate 52, which moves the head restraint 40 from the use position to the stowed position. With the head restraint 40 in the stowed position, the overall height of the seat back 14 is decreased to prevent interference with a seat located forward thereof or to allow stowage within a recess in the vehicle floor.

To return the head restraint 40 to the use position the seat back 14 is pivoted upwardly toward the seating position. As the seat back 14 pivots upward the cable path is shortened, thereby lengthening the effective length of the cable 86. More specifically, the distance between the third rotation axis 90 and the fixed location of the second end 94 of the cable 86 decreases as the seat back 14 is pivoted upwardly about the pivot axis 18 toward the seating position, lengthening the effective length of the cable 86. At the same time the clock spring 58 urges the first pulley 54 to rotate in the clockwise direction. Clockwise rotation of the first pulley 54 causes the lower link 64 to pivot in the clockwise direction about its first end 72, which simultaneously causes the upper link 62 to pivot in the counterclockwise direction about pivot 78. The movement of the linkage causes upward vertical movement of the guide plate 52, thereby moving the head restraint 40 from the stowed position toward the use position. Once the linkage goes back over-center to the positive locked condition the head restraint 40 is in the use position. With the head restraint 40 in the use position, the overall height of the seat back 14 is increased to provide comfort to and restrict occupant head movement.

In one alternative embodiment, it is contemplated that the mechanism 43 for automatically moving the head restraint 40 between the use position and the stowed position in response to pivotal movement of the seat back 14 relative to the seat cushion 12 could be a power mechanism. For example, a motor (not shown) is operatively coupled to the first pulley 54 for rotating the first pulley 54 in the counterclockwise direction thereby folding the linkage and lowering the head restraint 40 toward the stowed position in response to pivoting the seat back 14 forwardly toward the folded position. Similarly, the motor rotates the first pulley 54 in the clockwise direction thereby straightening the linkage and raising the head restraint 40 toward the use position in response to pivoting the seat back 14 upwardly toward the seating position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:
1. A seat assembly comprising:
a seat cushion;
a seat back pivotally coupled to said seat cushion for movement between a seating position and a folded position;
a head restraint mounted to a guide plate and operatively coupled to an upper end of said seat back for movement between a use position spaced apart from said upper end of said seat back and a stowed position adjacent said upper end of said seat back; and
a mechanism operative for automatically moving said head restraint between said use and stowed positions in response to pivoting said seat back between said seating and folded positions, said mechanism including a first pulley rotatably mounted to said seat back, a linkage pivotally coupled between said first pulley and said head restraint, and a cable operatively coupled between said first pulley and a fixed end, said linkage including a lower link extending between a first end fixedly secured to said first pulley and a second end and an upper link extending between a first end pivotally coupled to said guide plate and a second end pivotally coupled to said second end of said lower link, whereby pivoting said seat back from said seating position to said folded position effectively shortens said cable thereby rotating said pulley in a first direction and actuating said linkage to move said head restraint from said use position to said stowed position and whereby pivoting said seat back from said folded position to said seating position effectively lengthens said cable thereby rotating said pulley in a second direction and actuating said linkage to move said head restraint from said stowed position to said use position, and wherein said upper and lower links form a first angle greater than 180 degrees when said head restraint is in said use position.

2. A seat assembly as set forth in claim 1 wherein said upper and lower links form a second angle greater then 180 degrees when said head restraint is in said stowed position.

3. A seat assembly as set forth in claim 2 wherein said cable extends between a first end fixedly secured to said first pulley and a second end fixedly secured to said seat cushion.

4. A seat assembly as set forth in claim 3 wherein said mechanism includes a plurality of pulleys for guiding said cable between said first pulley and said seat cushion.

5. A seat assembly as set forth in claim 4 wherein said seat back defines a pivot axis and said first pulley is rotatably mounted about a first rotation axis generally perpendicular to said pivot axis.

6. A seat assembly as set forth in claim 5 wherein said plurality of pulleys includes a second pulley rotatably mounted to said seat back about a second rotation axis generally parallel to said first rotation axis and a third pulley rotatably mounted to said seat back about a third rotation axis generally parallel to said pivot axis, and wherein said second pulley is disposed between said first and third pulleys.

7. A seat assembly as set forth in claim 6 wherein the distance between said third rotation axis and said second end of said cable increases as said seat back pivots from said seating position to said folding position effectively shortening said cable thereby rotating said first pulley in said first direction and wherein the distance between said third rotation axis and said second end of said cable decreases as said seat back pivots from said folded position to said seating position effectively lengthening said cable thereby rotating said first pulley in said second direction.

8. A seat assembly as set forth in claim 7 including a tab fixedly secured to said second end of said upper link, wherein said tab abuts said second end of said lower link when said upper and lower links form said first angle.

9. A seat assembly as set forth in claim 8 including a means for biasing said head restraint toward said use position.

10. A seat assembly as set forth in claim 9 wherein said means for biasing is a spring engaging said first pulley and said seat back, said spring biasing said first pulley in said second direction.

11. A mechanism operative for automatically moving a head restraint mounted to a seat back between a use position spaced apart from the seat back and a stowed position adjacent the seat back in response to pivoting the seat back between a seating position and a folded position, said mechanism comprising:

a pulley rotatably mounted to the seat back;

a linkage pivotally coupled between said pulley and the head restraint, said linkage including a lower link extending between a first end fixedly secured to said first pulley and a second end and an upper link extending between a first end operatively coupled to the head restraint late and a second end pivotally coupled to said second end of said lower link; and a cable operatively coupled between said pulley and a fixed end, whereby pivoting the seat back from the seating position to the folded position effectively shortens said cable thereby rotating said pulley in a first direction and actuating said linkage to move the head restraint from the use position to the stowed position and whereby pivoting the seat back from the folded position to the seating position effectively lengthens said cable thereby rotating said pulley in a second direction and actuating said linkage to move the head restraint from the stowed position to the use position, and wherein said upper and lower links form a first angle greater than 180 degrees when the head restraint is in the use position.

* * * * *